United States Patent [19]  [11] Patent Number: 4,895,710
Hartmann et al. [45] Date of Patent: Jan. 23, 1990

[54] NITROGEN INJECTION

[75] Inventors: Gotfred Hartmann, Bekkestua; Helge G. Gran, P.O. Box 5555, N-4602 Kristiansand S, both of Norway

[73] Assignee: Helge G. Gran, Norway

[21] Appl. No.: 104,056

[22] PCT Filed: Jan. 23, 1987

[86] PCT No.: PCT/NO87/00009
§ 371 Date: Oct. 9, 1987
§ 102(e) Date: Oct. 9, 1987

[87] PCT Pub. No.: WO87/04420
PCT Pub. Date: Jul. 30, 1987

[30] Foreign Application Priority Data
Jan. 23, 1986 [NO] Norway .................................. 860239

[51] Int. Cl.⁴ ...................... B01D 50/00; C01B 21/00; E21B 43/16
[52] U.S. Cl. .................................... 423/351; 166/268; 166/305.1; 422/170
[58] Field of Search ......................................... 423/351

[56] References Cited

U.S. PATENT DOCUMENTS 914,279  3/1909  Hurford .............................. 423/351
3,145,085  8/1964  Breault ................................ 423/351
3,388,973  6/1968  Marquardt et al. ................. 423/351

FOREIGN PATENT DOCUMENTS 1137930 12/1968 United Kingdom .
1440476  6/1976 United Kingdom .

Primary Examiner—John Doll
Assistant Examiner—Wayne A. Langel
Attorney, Agent, or Firm—Bacon & Thomas

[57] ABSTRACT

A method for production of nitrogen for application at high pressure, preferably for pressure injection in submarine or substerranean oil or natural gas wells, by combination of natural gas in air, which is compressed prior to the combustion, for binding of the oxygen content of the air in carbon dioxide to be removed from the flue gas by absorption, whereas the remaining nitrogen is pressurized to a predetermined high pressure suitable for such application.

9 Claims, 1 Drawing Sheet

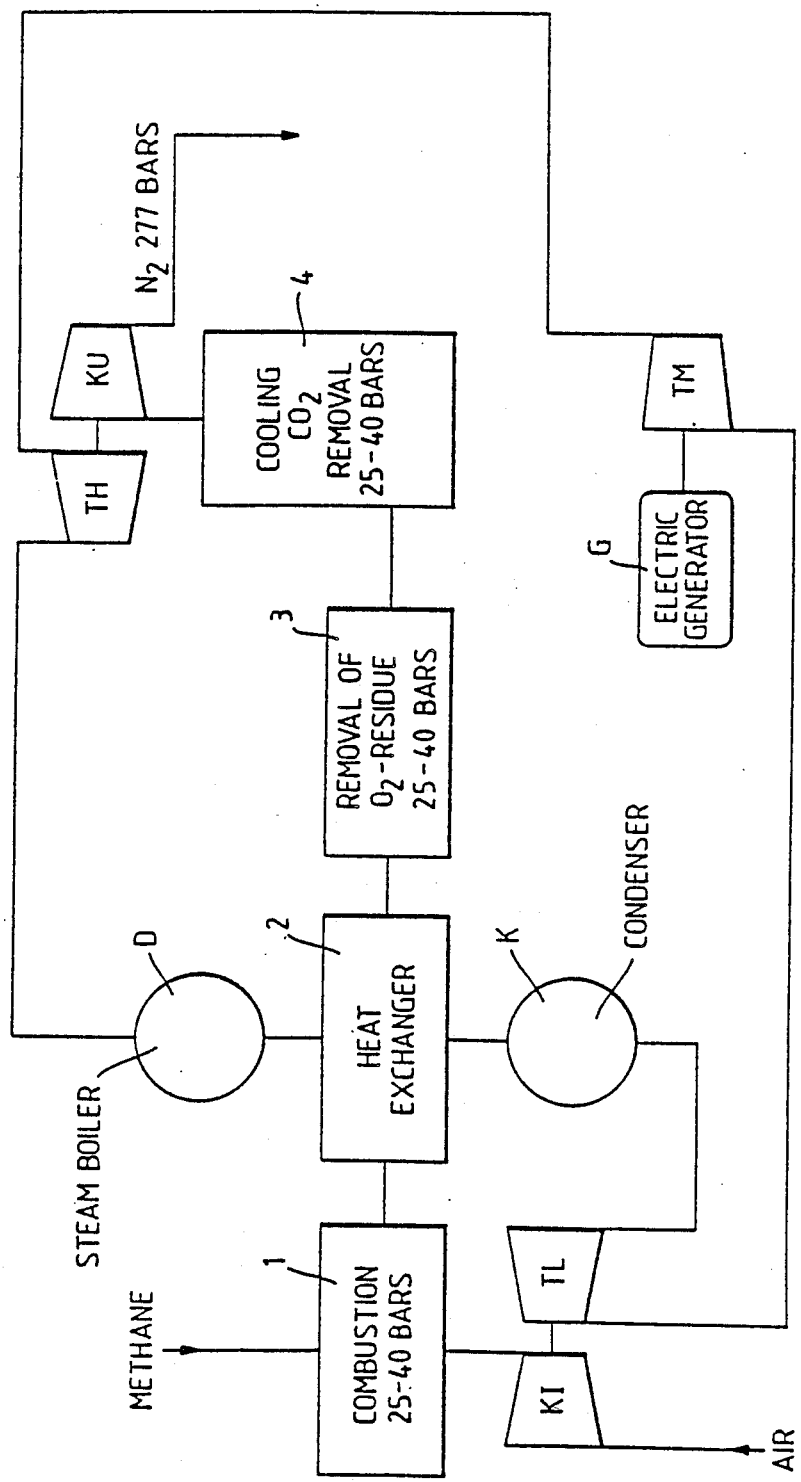

NITROGEN INJECTION

The present application is related to a method and a system for production of nitrogen for application at high pressure, preferably for pressure injection in submarine or subterranean oil or natural gas wells.

With recovering of oil and gas, in particular from submarine wells, it is in certain cases of importance to perform a pressure injection of nitrogen gas into the well in question to increase the operational pressure and prevent the well from collapsing. Such a situation is present for the Ekkofisk field in the North Sea, and in order to generate the necessary large amounts of nitrogen gas in this connection, it is suggested to produce nitrogen by combustion of natural gas in air for binding of the oxygen content of the air in carbon dioxide, which then is removed from the flue gas by absorption, whereas the remaining nitrogen is pressurized to a predetermined high pressure suitable for said application. In the suggested system the combustion takes place partly in gas turbines and partly through direct combustion of gas in boiler systems at atmospheric conditions. The system is then very space-demanding, unpractical and heavy.

This implies very great disadvantages when mounted on an off-shore platform, and it is then an object of the invention to provide a method as stated above, but in which the indicated disadvantages are overcome.

Thus, the invention concerns a method for production of nitrogen for application at high pressure, preferably for pressure injection in submarine or subterranean oil or natural gas wells, by combustion of natural gas in air, which is compressed prior to the combustion, for binding of the oxygen content of the air in carbon dioxide to be removed from the flue gas by absorption, whereas the remaining nitrogen is pressurized to a predetermined high pressure suitable for said application.

A compression of the combustion air for the present purpose is known in principle from British Patent Specification No. 1.440.476, and in view of this known prior art, the unique features of the method according to the invention are that the compression of the combustion air prior to the combustion is made to a preselected, operationally optimum intermediate pressure between said predetermined high pressure and the atmospheric pressure, and substantially above the latter pressure, the heat energy developed by the combustion being heat exchanged at the intermediate pressure with water for production of steam, which subsequently is utilized for mechanical work, preferably in steam turbines for compression to the intermediate pressure and maintenance of said predetermined high pressure.

As the injection pressure in this connection would be of the order of magnetude 100–500 bars, an immediate pressure of 10–60 bars, normally 25–40 bars, is preferably applied.

The residual oxygen in the flue gas is preferably removed by addition of hydrogen for wet combustion with the oxygen while the flue gas is guided past a catalyst at said intermediate pressure.

By compressing the combustion air to e.g. 25–40 bars before the combustion and performing the gas combustion and energy recovering at this pressure, the gas volumes under treatment are reduced in the corresponding proportion, i.e. with a factor at 1/25–1/40, and at the same time the heat transfer conditions are dramatically improved.

The invention also concerns a system for production of nitrogen by the method indicated above, the system comprising a combustion chamber for combustion of natural gas in air, which is compressed prior to the combustion, for binding of the oxygen content of the air in carbon dioxide to be removed from the flue gas in an absorption device, and an outlet compressor for pressurizing the remaining nitrogen to a predetermined high pressure suitable to said application.

In view of prior art the system of the invention is then characterized by the feature that it further comprises an inlet compressor disposed and adapted for said compression of the combustion air to a preselected, operationally optimum intermediate pressure between said predetermined high pressure and the atmospheric pressure, and substantially above the latter pressure, as well as for feeding the pressurized air to the combustion chamber, which is adapted for combustion in the air at said optimum intermediate pressure, and a heat exchanger connected with the combustion chamber and adapted for heat exchange at said intermediate pressure between the developed flue gases and supplied water for steam production in a steam boiler, preferably for operation of steam turbines disposed for the driving of said inlet and outlet compressors.

The absorption device preferably comprises nozzles for injection and atomization of water in the flue gas in order to achieve the absorption of the carbon dioxide content of the gas at said intermediate pressure.

Optionally, a further steam turbine may be included for operation of an electrical generator when supplied with possible excess steam.

A system of this type would be essentially more light-weighted, less costly, plainer and more reliable than the abovementioned, suggested system for the same purpose.

The invention will now be described in more detail by means of an exemplified embodiment with reference to the accompanying drawing, the only FIGURE of which shows a schematical outline of a system according to the invention.

The core of the illustrated system is a combustion chamber 1, which is supplied with methane as well as combustion air, which by means of an inlet compressor KI is compressed to an intermediate pressure of 25–40 bars, and then the combustion of methane in the combustion chamber 1 also takes place at this pressure. The quantity ratio between the supplied methane and the combustion air is generally adjusted in such a manner that essentially complete combustion is achieved at the intermediate pressure, which in practice means that less than 0.5% oxygen is present in the flue gases developed by the combustion. Under certain operative conditions, however, it may be appropriate to perform the combustion substoichiometric.

The flue gases are guided through a heat exchanger 2 for exchanging heat with supplied water for produciton of steam in a steam boiler D. This heat exchange then takes place very efficiently at the established intermediate pressure of the magnetude 25–40 bars.

From the heat exchanger the exhaust or flue gas is furthered to a combustion unit 3, in which the residual oxygen is reduced to a proportion of 5 ppm by addition of hydrogen to the flue gas, which subsequently is made to pass a catalyst at a temperature of the order of magnitude 180° C.

Combined cooling of the flue gas and removal of the carbon dioxide takes place in a cooling and adsorption device 4. During the treatment of the flue gas the pressure in this device is still 25–40 bars, and sea water in atomized form is then used as a $CO_2$-absorbent. Under the prevailing conditions this device may in fact be included in a power-producing cooling and absorption process developed by Norsk Hydro, as the expansion of $CO_2$ provides a further power contribution.

After the removal of posible residual oxygen and the carbon dioxide content of the flue gas, the gas delivered from the device 4 would essentially consist of nitrogen at a pressure of 25–40 bars, corresponding to the established intermediate pressure according to the invention. This nitrogen gas is then supplied to an outlet compressor KU for increasing the gas pressure to the predetermined injection pressure, which in the present case is 277 bars.

As mentioned above, the heat energy recovered from the heat exchanger 2 is utilized for production of steam in a steam bolier D, preferably for the operation of steam turbines.

These turbines are primarely a high pressure turbine TH for the operation of the outlet compressor and a low pressure turbine for the operation of a inlet compressor, but beyond this the process would normally provide excess energy for operation of e.g. an electric generator G by means of a further steam turbine TM, which is inserted in the steam circuit between the high pressure turbine TH and the low pressure turbine TL. On the outlet side of the turbine TL the exploited steam is conveyed to a condenser K, from which condensed water is again supplied to the heat exchanger 2 for steam production.

As an example of operational parameters in the above-mentioned system it may be indicated that a produced nitrogen volume of 17 millions m³ per 24 hours corresponds the following values:

| Injected nitrogen volume | 186 $Nm^3/s$ |
| --- | --- |
| Injection pressure | 277 bars |
| Air volume for compression | 235 $Nm^3/s$ |
| Methane consumption | 24,7 $Nm^3/s$ |
| Energy content of the methane | 890 Mw |
| Output from the steam turbines | 330 Mw |
| Required compression power | 210 Mw |
| Net power surplus | 120 Mw |

As deduced from this example, the process gives a power surplus of 120 Mw. This excess may be utilized for production of electric energy, which advantageously may be used on the involved production platform for oil and gas recovery. This may substantially reduce the natural gas consumption of the platform, as gas turbine operated current generators with low thermal efficiency may be excluded.

Combustion and heat transfer at 25–40 bars would to a high extent reduce the space requirements of a system for the present purpose. At the first heat surface of the heat exchanger heat transfer of the order of magnetude 1 $Mw/m^2$ is achievable. Thus, the process outfit would be very compact. A combustion chamber with attached interconnected heat exchanger and steam boiler having diameter 4 m and length 15 m may be considered. With a flow velocity of 0.5 m/s through a cooling and absorption tower 4 its external diamter would be 5 m. In each case a thorough optimation calculation would be required in order to establish the most favourable intermediate pressure. It is possible that intermediate pressures up to 50 bars and higher would provide optimum operational conditions in certain cases.

Apart from steam turbines, compressors and electric generator the outfit included in the present system would be of a low-cost type. Thus, a very reasonable and plain system for nitrogen injection would be achievable according to the present invention.

We claim:

1. In a method for the production of pressurized nitrogen for injection application at high pressure, said method being of the type which comprises combusting natural gas in air, which is compressed prior to the combustion, whereby said combustion forms a flue gas containing nitrogen and carbon dioxide and said combustion binds the oxygen content of the air in the carbon dioxide; removing the carbon dioxide from the flue gas by absorption, and then pressurizing the remaining nitrogen to a high pressure required for said injection application, wherein the improvement comprises compressing the combustion air prior to the combustion to an intermediate pressure between said high pressure and atmospheric pressure, the heat energy developed by the combustion being heat exchanged at the intermediate pressure with water for production of steam, which subsequently is utilized for mechanical work for compression to the intermediate pressure and maintenance of said high pressure.

2. The method as claimed in claim 1, wherein the intermediate pressure is 10–60 bars.

3. The method as claimed in claim 1, wherein any residual oxygen in the flue gas is removed by addition of hydrogen for combustion with the oxygen while the flue gas is guided past a catalyst.

4. The method as claimed in claim 1, wherein the carbon dioxide is removed from the flue gas at said intermediate pressure by absorption in water.

5. The method of claim 1, wherein a steam turbine is used for compression to the intermediate pressure and maintenance of said high pressure.

6. The method of claim 2, wherein the intermediate pressure is 20–40 bars.

7. The method of claim 3, wherein the residual oxygen is removed from the flue gas at the intermediate pressure.

8. The method of claim 4, wherein the water is atomized sea water.

9. The method of claim 8, wherein the water is additionally used for cooling the flue gas at the intermediate pressure.

* * * * *